CELITE 512 FILTER AID VS. CELITE 503
+ SWIFT 710. AVERAGES FOR FOUR RUNS
EFFLUENT TURBIDITY.

Feb. 9, 1971  D. W. DAVIS ET AL  3,562,154
HIGH EFFICIENCY FILTER AID
Filed May 26, 1965  4 Sheets-Sheet 4
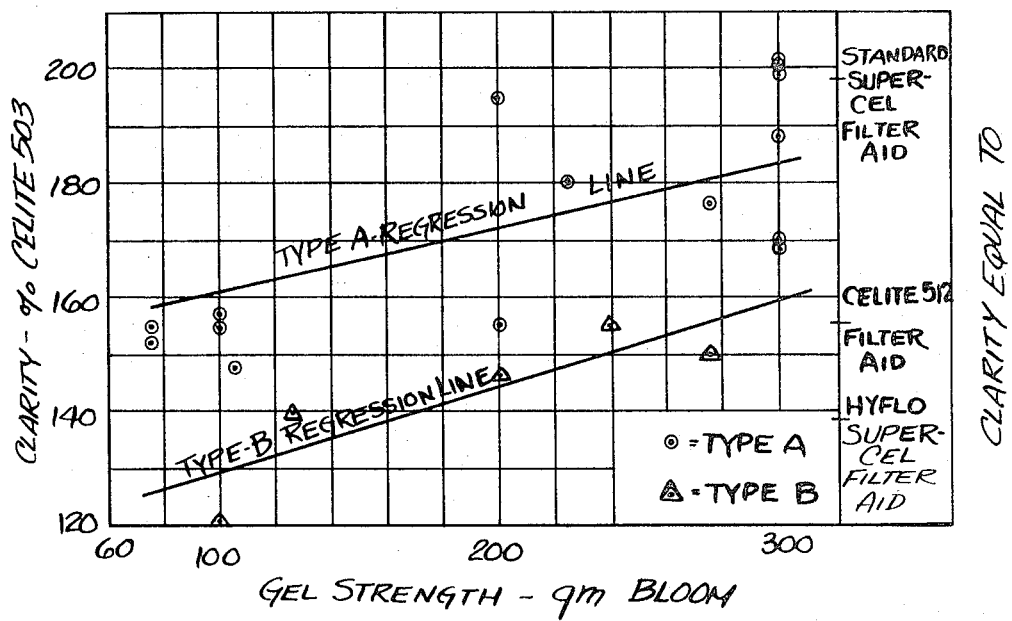
INVENTORS
DONALD WILLIAM DAVIS
JAMES MICHAEL BALOGA
BY BRUCE CHAMBERLIN OLMSTED, JR.
ATTORNEY United States Patent Office 3,562,154
Patented Feb. 9, 1971

3,562,154
HIGH EFFICIENCY FILTER AID
Donald William Davis, Clinton, and James Michael Baloga and Bruce Chamberlin Olmsted, Jr., Somerville, N.J., assignors to Johns-Manville Corporation, New York, N.Y., a corporation of New York
Filed May 26, 1965, Ser. No. 458,883
Int. Cl. B01d *15/00*
U.S. Cl. 210—36                                     7 Claims

ABSTRACT OF THE DISCLOSURE

Simultaneously improved flow rate and turbidity removal by adding to the turbid solution to be filtered an animal protein gelatin or glue, or by coating a filter aid with an animal protein gelatin or glue.

---

Figure 1:
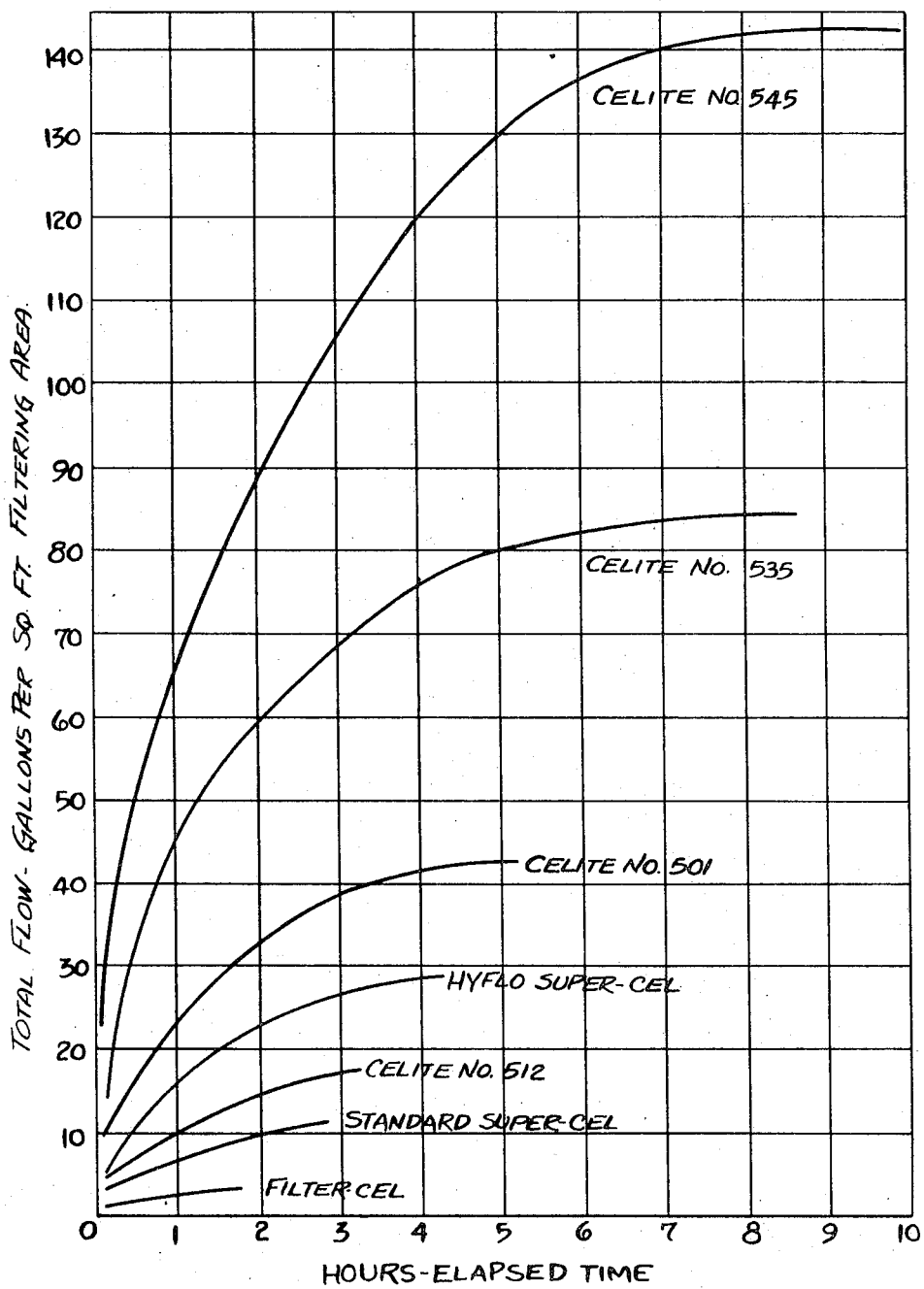

This invention relates to an improved method of removing finely divided insoluble materials from liquids. It is especially concerned with the removal of suspended colloidal matter from water-based liquids, such as the clarification of beer and the removal of turbidity from water. More specifically, this invention relates to filter aid filtration which converts insoluble materials to a filterable state by attachment to a rigid filter aid particle.

Of the many impurities found in water-based liquids, turbidity is among the most troublesome. Turbidity is defined as a lack of clearness in the liquid, but should not be confused with color, for a liquid may be dark in color, but nevertheless clear and not turbid. This lack of clearness is primarily due to suspended matter in a finely divided state and may be the result of silt, organic matter, microscopic organisms, and similar materials. Consequently, turbidity is the measure of the optical obstruction of light passing through the liquid, caused by the suspended particles rather than in any terms of weight concentration.

The removal of finely divided solids and colloids from water-based liquids has been attempted for many years. Filtration has been used for effecting this removal by forcing the liquid, under a pressure differential, through a filter medium, with slow sand filters being the first structures devised to accomplish this. These sand filters have had several disadvantages including the inability to handle effectively many types of contamination found in water supplies and such low capacity that large areas and expensive construction have been required. Coarser sand structures, termed rapid sand filters, which act largely as straining devices have been subsequently employed.

It is important to understand that these filters themselves have little inherent clarifying capacity in that the suspended matter must necessarily be treated to collect or coalesce into sufficiently large agglomerates so as to settle out and be substantially removed in advance of the rapid sand filters.

The processes which cause this coalescence have been termed pretreatment among water-works engineers and operators. Almost never is the non-pretreated water filtered through a rapid sand filter if high quality filtered liquid is desired, and it is commonly understood that the term "sand filter plant" includes the pretreatment works which are substantially larger and more expensive than the sand filter structures themselves. This technique is more fully explained in Betz's Handbook of Industrial Water Conditioning.

In this treatment a coagulant is added to the liquid as the agent necessary to facilitate the settling out of the colloidal or finely divided suspended matter. The coagulants themselves are made effective such as by agitation and flocculation. U.S. Letters Patent Nos. 2,393,269; 2,937,143; and 3,066,095 are representative of the prior art teachings utilizing this technique of first settling and then filtering. Because the size and cost of the foregoing processes make them unavailable to most processors, small communities and industries have continued to have difficulty associated with the treatment of water-based liquids.

Recently innovations have been put forth purporting to improve rapid sand filter turbidity removal performances when, in reality they are improvements to the pretreatment process which precedes the actual filter operation. The reason for this becomes apparent, when it is understood that any appreciable amount of residue not removed by settling from the filter influent will quickly tend to clog the filter and produce impractical head losses in relatively short and uneconomical time span.

While the above might be termed the traditional approach to liquid filtration, the principle of filter aid filtration has been advanced to effect clarification of water-based liquids. Certain economies result from the simplicity of the process as the requirements for large and expensive structures to provide for floc formation or particle attachment and settling periods are reduced or eliminated.

This technique involves the incorporation of a small amount of finely divided particulate filter aid material in the liquid to be filtered. By so doing, the filter aid functions to form continuously a porous cake upon the filtering medium surface and in actuality, to entrap impurities by various mechanisms. The materials most generally used as filter aids are diatomaceous silica, perlite, and other siliceous materials, carbon, and fibrous matter, such as asbestos and cellulose, and mixtures of these. A particularly important feature of the filter aid filtration is that the pores of the surface of the filter aid cake are far smaller than those in the filter septum, thereby enabling the removal of a very substantial portion of the suspended particles. The proportion removed will, of course, be a function of the size and the nature of the particles to be filtered and the porosity and inherent clarifying ability of the particular filter aid. This technique, therefore, is to be distinguished from the pretreatment bed filtration as all the liquids with the suspended solids is passed to the filter per se.

It was early determined that the technique could be improved by treating the filter aids so as to cause the impurities to affix themselves to the filter aid particles and thus filter out along with the filter aid. The art observed that many colloidal impurities in aqueous liquids are electro-negative and, therefore, proposed that an electro-positive filter aid be used so as to attract the impurities by this mutual electrical attraction.

One of the earliest disclosures of such a technique is that described in U.S. Letters Patent No. 2,036,258. The patentee therein proposes to flocculate upon the surface of the filter aid a hydrate of a multivalent inorganic salt which may be converted to the hydroxide by proper pH conditions of the liquid being used. Various other techniques have been advanced as improvements upon this technique and these may be illustrated by the disclosures in U.S. Letters Patent No. 3,235,492 patented on Feb. 15, 1966 and No. 3,247,106 patented on Apr. 19, 1966, respectively, and assigned to the instant assignee.

Even with these advances, some difficulty remains in completely and effectively removing finely divided turbidity and other colloidal matter from water-based liquids and accordingly, the art has continued to seek additional techniques to achieve effective removal.

One of the principal concerns of the art is to provide filter aids with higher clarifying capacity while maintaining high flow rate characteristics which dictates the filtration efficiency. Another area of interest to the filtration art is to provide a filter aid which will effectively reduce turbidity and the like to acceptable levels regardless of variations in the amount of turbidity of the liquid as it passes through the filtration cycle.

It is accordingly a principal object of this invention to provide a more practical and effective means whereby the deficiencies of the foregoing filter aid filtration processes are overcome.

It is a further object of this invention to provide a method of clarifying and substantially purifying water-based liquids by filter aid filtration whereby maximum effectiveness and improved filtration characteristics are achieved as to removal of turbidity, color and other insoluble suspended particles.

It is another object of this invention to provide a new and more practical method of treating water-based liquids by providing improved flow rate filter aid materials without any deleterious effects as to the clarification and purification of the water.

It is another object of this invention to provide a practical means of purifying turbidity contaminated water sources to render them potable.

Additional objects and further scope of applicability of the present invention will become apparent in the detailed description given hereinafter.

It has now been determined that the foregoing objects may be satisfied and the above-mentioned problems lessened by providing a novel method of treating the insoluble contaminant laden water-based liquids. It has been discovered that the technique of filter aid filtration may be improved by using a protein colloid in conjunction with conventional filter aid based materials. More specifically, it has been determined that certain protein colloids, i.e., gelatin and glue, having specific gel strength, may be combined either as a coating upon or as a physical mixture with the filter aid in the liquid to be treated, and preferably used under proper pH conditions to maintain the protein colloid below its isolectric point, generally about 8, to remove efficiently and effectively insoluble impurities contained in the water by standard filter aid filtration techniques.

The chemistry of gelatins and glue is a much discussed and reviewed portion of chemistry. It is generally recognized, however, that gelatin is an organic nitrogenous colloidal substance of the protein class which is derived by the selective hydrolysis of collagen from the skin, connective tissue and bones of animals. Glue, on the other hand, is an impure or degraded form of gelatin obtained by reaction of heat and water on the same base material. Generally the gelatin is selected and treated with a special care so that the resulting product is cleaner, purer, and generally clearer in color than glue. Much has been written on the chemistry of these protein colloids and, perhaps, one of the best disclosures of that chemistry is that entitled "Gelatin, the Current Position" by A. G. Ward, Journal of the Society of Leather Trade Chemists, vol. 44, 1960, pp. 505–518.

While recognizing gelatin and other proteinaceous materials have been used in the treatment of wine in combination with settling techniques to remove soluble materials (such as represented by U.S. Letters Patent No. 706,075 and others cited above), the art has failed to appreciate that gelatin, when controlled under proper pH conditions and in combination with filter aid filtration, may be used to extremely surprising advantages in the removal of suspended insoluble particulate material from water-based liquids. It has been determined that the combination of small quantities of gelatin with the body feed in a standard filter aid filtration technique has produced many advantages. This is effected either as a coating upon the filter aid or as a separate addition to provide a mixture within the liquid to be treated.

Specific advantages have involved improved head loss rates to clarity ratio as contrasted with the filter aid per se, improved clarity at the initial portion of the filtration cycle, improved ability to handle a high inffluent turbidity while maintaining consistent and constant effluent turbidity, and improved ability to hold low effluent turbidity despite influent fluctuations without immediate filter blockage and shortened filtration cycles.

FIG. 1 discloses the relative rates of flow obtained with "Celite" filter aids in an average industrial clarification.

Figure 2:
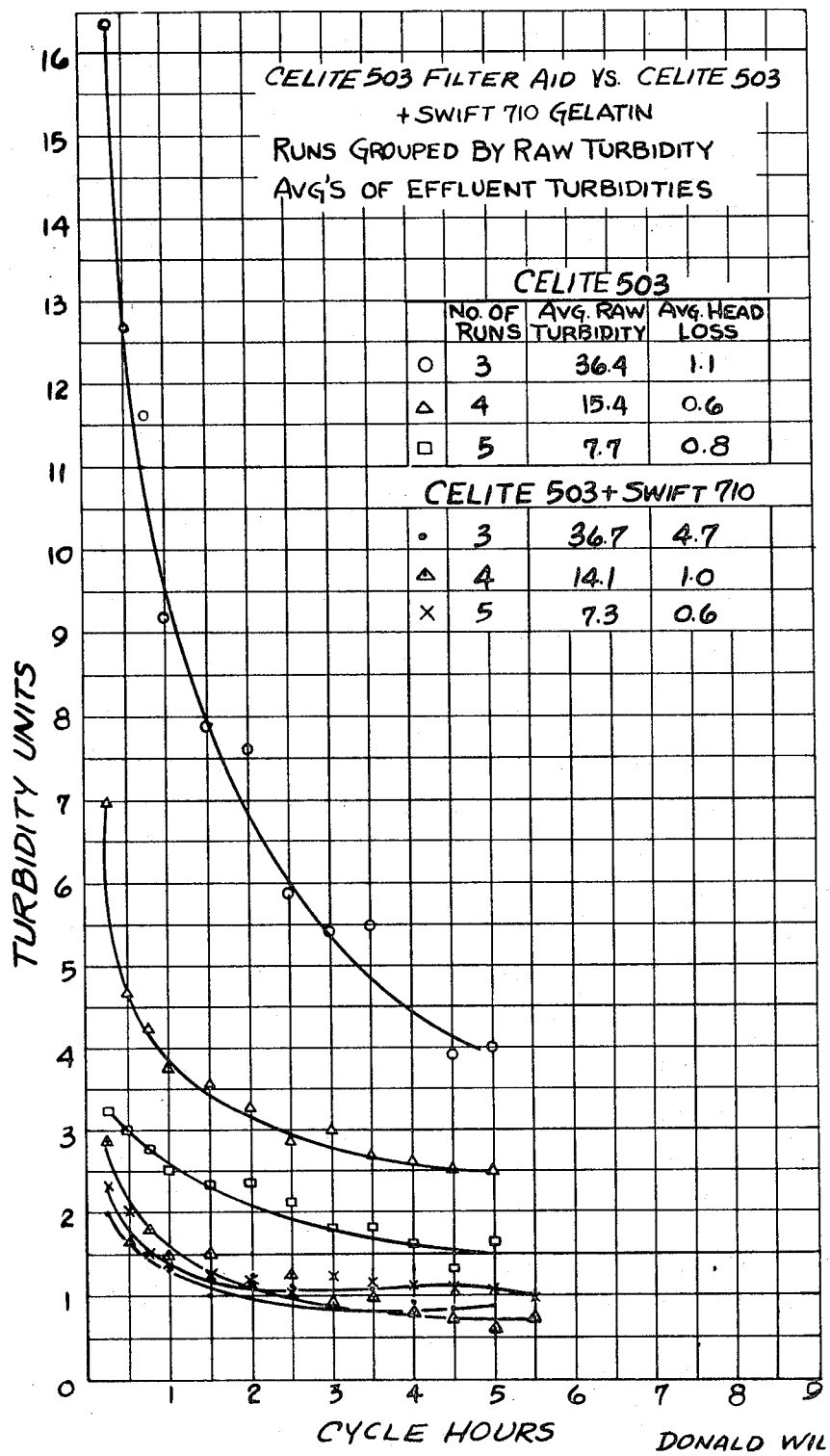

FIG. 2 compares a "Celite" 503 filter aid versus a "Celite" 503 filter aid in combination with added "Swift's" 710 gelatin.

Figure 3A:
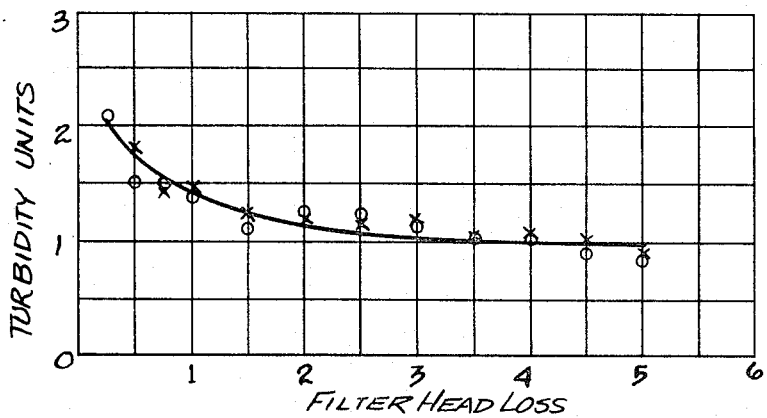
Figure 3B:
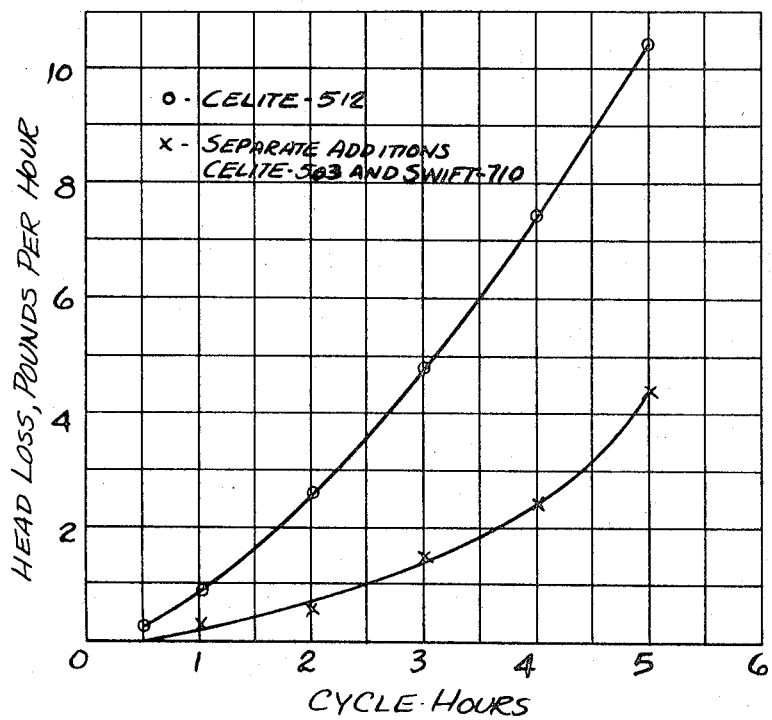

FIG. 3 compares "Celite" 512 to the combination of "Celite" 503 plus the "Swift's" 710.

FIG. 4 illustrates an evaluation of alternative sources and grades of protein colloid.

It has been determined that the addition of the protein colloid in an amount between 0.02 and 20.0 parts per million (p.p.m.) based on the liquid to be treated, when added in combination with the filter aid, improves the filter liquid clarity. With regard to the treatment of water, 0.2 to 2.0 p.p.m. is generally sufficient. As to industrial treatment, the amount of addition is dependent upon the degree of contamination and the desired purity. The amount of filter aid used, likewise, varies dependent upon the liquid being treated but generally varies between 2 and 200 p.p.m. A more complete understanding of the invention will become apparent from the examples herein of the operation within the scope of the invention.

Before discussing the specific examples, it is believed desirable to appreciate fully the filtration effects of certain commercially available filter aids. A class of diatomaceous silica filter aids sold under the trademark "Celite" have been produced having a variety of flow rate and clarifying capacities. Generally speaking, the higher the clarifying capacity of the filter aid, the lower the flow rate. The relative flow rates of these filter aids are shown in the graph in the accompanying drawing identified as FIG. 1.

The following equipment and test procedure were used to evaluate the instant invention. Two single element test filters were used with direct feed and pressure supplied by a self-priming centrifugal pump. Slurried body feed and other ingredients were pumped into feed lines against raw water pressure. A detention tube was used in one of the filter lines to give a three-minute contact time for body feed or additives ahead of the filter. The filter medium per se was precoated in a conventional fashion at one-tenth of a pound per sq. ft. of filter area. Turbidity calculations were made by taking samples from the common raw water header and from each filter effluent line. The body feed additions were made up as a slurry in a fifty-gallon tank using the raw water for the carrier. The slurry was fed at about 150 ml. per minute to the raw water line ahead of the filters using the diaphragm pump. In some runs the regular filter aid was slurried up in the tank and then sufficient protein colloid solution was introduced to obtain the desired addition.

When separate additions of protein colloid were desired, a separately stirred solution tank and diaphragm pump were installed with a separate pumping line to the raw water line. Thus the filter aid was pumped into the raw water stream separately from the protein colloid solution.

In the accompanying tables, the amount of protein colloids used is stated as mg. per g., as well as parts per million. The mg. per g. is the milligrams of additive used per gram of body feed and is the term best applicable to coated filter aid. The term "head loss" is the average increase in the pressure per hour required to maintain one gallon per square foot flow rate. It is stated in pounds per hour with the average pressure filter having 35 pound pressure rise available for a cycle. Filtration cycles were generally terminated by time without reaching terminal head losses. It is important to note that in this type of filtration and generally in diatomite filtration, the cycle is terminated by pressure increase rather than by breakthrough. Most cycles were run 5 to 6 hours before termination to make direct comparison of the data more valid.

EXAMPLES I–XIII

Gelatin (Swift 710) additions of between 0.02 and 0.08 parts per million were employed in these specific examples, varying according to the above procedure.

The coated examples were made by coating Swift 710 gelatin on Celite 503 filter aid at three levels of gelatin addition. The Swift 710 gelatin is a food grade gelatin of approximately 300 Bloom gel strength and coatings were made at the levels of 1.9, 2.9, and 5.8 mg. of gelatin per gram of filter aid. A 1% solution of gelatin was sprayed into a ribbon mixer containing the Celite 503 filter aid. The batches were dried below 220° F., above which the gelatin would degrade.

The data from these runs is summarized in Table 1 below showing significant differences in the head loss and effluent turbidity when low concentrations of gelatin were used and the effectiveness of the coated filter aid versus the separate addition of the filter aid and the gelatin material. Coated precoat filter aid was used in all cases.

achieved at low turbidity level. Filtered water with turbidities below the maximum acceptable limit is produced from raw water when turbidity ranges from 7 to 36 units. The lines for filtered water when using gelatin for all three turbidity groups are in the same band showing a constantly good filtered water turbidity.

EXAMPLES XIV–XXVII

Since separate addition of the gelatin and the filter aid appeared to give good turbidity removal result, a series of tests were made against several grades of filter aid. These results are demonstrated below in Table 2. Previous testing had established that addition of gelatin improved turbidity removal when added with Celite 503 filter aid.

Example XIV shows this improvement with a low turbidity of raw water. Examples XVI and XVIII were made with a much higher turbidity raw water and established the removal efficiency of the protein colloid Celite 503 filter aid combination, when compared with Hyflo Super-Cel filter aid which is considered a more

TABLE 1

[Swift 710 coated Celite 503 [1], filter aid study by coating concentration]

| Run No.: | Swift 710 concentration | | B.F./ turbidity ratio | Average turbidity | | Head loss, lb./hr. |
|---|---|---|---|---|---|---|
| | Mg./g. | P.p.m. | | Raw | Eff. | |
| 1 | 1.9 | 0.03 | 1.5/1 | 11.3 | 1.4 | 2.6 |
| 2 | 2.9 | 0.05 | 1.4/1 | 11.3 | 1.35 | 2.7 |
| 3 [2] | 5.8 | 0.08 | 1.6/1 | 8.2 | 1.1 | 5.6 |
| 4 | 2.9 | 0.03 | 1.9/1 | 6.3 | 1.6 | 0.36 |
| 5 | 2.9 | 0.03 | 1.8/1 | 6.6 | 1.3 | 0.64 |
| 6 [2] | 2.9 | 0.03 | 1.8/1 | 6.6 | 1.2 | 0.77 |
| 7 [2] | 2.9 | 0.05 | 2.9/1 | 6.4 | 1.1 | 0.29 |

[1] All runs using coated filter aid for precoat and body feed.
[2] Three-minute detention ahead of filtration.

[Coated Celite 503 filter aid vs. separate addition of Celite 503 filter aid and Swift 710]

| Run No.: | Addition method | Swift 710 concentration | | BF./ turbidity ratio | Average turbidity | | Head loss, lb./hr. |
|---|---|---|---|---|---|---|---|
| | | Mg./m. | P.p.m. | | Raw | Eff. | |
| 1 | Coated | 1.9 | 0.03 | 1.5/1 | 11.3 | 1.4 | 2.6 |
| 8 | Separate | 1.45 | 0.03 | 1.9/1 | 11.8 | 1.15 | 1.1 |
| 9 | Coated | 1.9 | 0.07 | 2.25/1 | 16.3 | 1.0 | 1.1 |
| 10 | Separate | 1.6 | 0.06 | 2.4/1 | 16.3 | 1.5 | 0.7 |
| 5 | Coated | 2.9 | 0.03 | 1.8/1 | 6.6 | 1.3 | 0.6 |
| 11 | Separate | 2.0 | 0.04 | 2.8/1 | 7.4 | 1.5 | 0.7 |
| 12 | Coated | 5.8 | 0.56 | 2.2/1 | 43.1 | 4.9 | 0.9 |
| 13 [2] | Separate | 5.3 | 0.48 | 2.1/1 | 43.1 | 1.0 | 6.8 |

The improved clarity achieved by the low concentration treatment is represented graphically in FIG. 2. Each line on the graph represents the average filtered water turbidity for a group of runs made under similar conditions. Three groups with raw water turbidity ranges of 5–10, 10–20, and 30–50 are shown. Similar groups are also shown using body feed of Celite 503 filter aid, a high flow rate filter aid, and using Celite 503 filter aid with Swift 710 gelatin. The improved average clarity of the runs with the gelatin addition is shown in comparison of the lines of equal raw water turbidity. The excellent clarity at the beginning of the run is also illustrated in this figure. All average turbidities for the run with the gelatin addition were below 3 turbidity units after 15 minutes of the cycle, while without gelatin addition, the average turbidity ranged from 3.25 to 16.4, dependent upon the raw water turbidity. Excellent removal was effective filter aid than the Celite 503 filter aid as far as clarity is concerned. (See FIG. 1.) The high dosages of protein colloid effected a reduction of turbidity from 30 units from less than 1.5 in a short period of time and permitted an extended cycle for runs which correspond to Examples XX–XXVII, with the uneven numbered runs corresponding to use of filter aid per se of a high clarity capacity and demonstrated the ability of the gelatin and filter aid to maintain the clarity expected from the high clarity filter aid (Celite 512 filter aid), while maintaining head losses well below those corresponding to this filter aid. This is also demonstrated in FIG. 3(a) and 3(b). It is again significant to note that the use of the combination of protein colloid and filter aid produced a consistency in the average effluent turbidity at 1.1 to 1.4 units despite the varied change in the average raw water turbidity from 7.4 to 34.5.

TABLE 2.—SEPARATE ADDITION OF SWIFT 710 GELATION AND CELITE 503 FILTER AID VS. VARIOUS FILTER AID GRADES

| Run No. | Swift 710 Mg./g. | P.p.m. | Body feed and precoat | B.F./ turbidity ratio | Avg. turbidity Raw | Effluent | Head loss, lb./hr. |
|---|---|---|---|---|---|---|---|
| 14 | 1.7 | 0.05 | Celite 503 | 4.1/1 | 7.7 | 1.3 | 0.2 |
| 15 | | | do | 3.7/1 | 7.7 | 1.8 | 0.3 |
| 16 [1] | 5.0 | 0.47 | do | 2.7/1 | 34.5 | 1.3 | 3.0 |
| 17 | | | Hyflo Supercel | 2.7/1 | 34.5 | 6.6 | 0.6 |
| 18 | 6.3 | 0.45 | Celite 503 | 1.9/1 | 32.5 | 1.2 | 4.4 |
| 19 [1] | | | Hyflo Supercel | 1.9/1 | 32.5 | 4.5 | 1.1 |
| 20 | 2.3 | 0.09 | Celite 503 | 2.8/1 | 14.1 | 1.3 | 0.75 |
| 21 | | | Cleite 512 | 2.0/1 | 14.1 | 1.7 | 3.9 |
| 22 | 1.3 | 0.03 | Celite 503 | 2.3/1 | 8.5 | 1.4 | 1.0 |
| 23 | | | Celite 512 | 1.9/1 | 8.5 | 1.0 | 2.25 |
| 24 | 2.0 | 0.04 | Celite 503 | 2.8/1 | 7.4 | 1.2 | 0.7 |
| 25 | | | Celite 512 | 3.0/1 | 7.4 | 1.1 | 1.1 |
| 26 | 2.2 | 0.03 | Celite 503 | 1.9/1 | 11.8 | 1.1 | 2.8 |
| 27 | | | Celite 512 | 1.9/1 | 11.8 | 1.0 | 3.6 |

[1] Three minutes' detention ahead of filtration.

EXAMPLES XXVIII–XXXVII

Having thus demonstrated the effectiveness of one protein colloid, i.e., the Swift 710, a complete investigation was conducted on additional types of protein colloid. The data from these runs are presented in Table 3 below.

As seen from the table, all the gelatin and the Celite 503 filter aid combinations tested were effective in obtaining good turbidity removal and better than average removal than Celite 503 filter aid with the exception of the one run. Head losses were good when turbidity removal is considered.

TABLE 3.—SEPARATE ADDITION OF VARIOUS SWIFT GELATINS AND CELITE 503 vs. CELITE 503

| Run No. | Addition Grade | Mg./g. | P.p.m. | Precoat and B.F. | B.F./ turbidity ratio | Average turbidity Raw | Effluent | Head loss, lb./hr. |
|---|---|---|---|---|---|---|---|---|
| 28 | Swift 410 (Type A-200 bloom) | 1.9 | 0.03 | Celite 503 | 1.8/1 | 10.0 | 1.2 | 1.1 |
| 29 | | | | do | 1.9/1 | 10.0 | 1.5 | 1.3 |
| 30 | Swift 410 | 4.9 | 0.49 | do | 2.1/1 | 47.5 | [1] 2.8 | 3.2 |
| 31 | | | | do | 2.5/1 | 47.5 | 9.1 | 1.3 |
| 32 | Swift 210 (Type A-150 Bloom) | 6.0 | 0.24 | do | 2.1/1 | 19.6 | 1.6 | 1.4 |
| 33 | | | | do | 1.7/1 | 19.6 | 1.1 | 3.2 |
| 34 | Swift 3/4B | 3.6 | 0.16 | do | 3.3/1 | 12.8 | 1.8 | 0.4 |
| 35 | | | | do | 2.6/1 | 12.8 | 2.4 | 0.7 |
| 36 | Swift 5V | 5.3 | 0.34 | do | 2.0/1 | 31.5 | 1.9 | 1.9 |
| 37 | | | | do | 2.0/1 | 31.5 | 5.0 | 1.4 |

[1] High average because of high early reading caused by late start of Swift 410 addition.

An evaluation was also made of the separate solution of colloid per gram of Celite 503 filter aid to a standard sugar filtration test. The results obtained are illustrated in FIG. 4.

The correlation of clarity with gel strength of both type A and type B protein used were developed by regression analysis of the data and are significant at the 90–95% levels. Little differences between equivalent grades of different manufacturers were found. All products tested were food grade products, although technical grade equivalents have been found to work. Several grades of glue were also tested so as to evaluate completely the protein colloids. Gel strength as low as 60 grams Bloom were employed and are equivalent to about 75–100 Bloom strength type B gelatin. The Bloom strength ranged from about 60 to about 300 and includes both type A and type B gelatin.

While the invention has demonstrated exceptional value in removing insoluble contaminants, it is also useful for removing color and similar soluble impurities.

It is believed that the above provides a complete description of the invention in such manner as to distinguish it from other inventions and from what is old, and provides a description of the best mode contemplated of carrying out the invention and thereby complies with the patent statutes.

It is to be understood that variations and modifications of the invention, as illustrated by specific examples herein, may be made without departing from the spirit of the invention. It is also to be understood that the scope of the invention is not to be interpreted as limited to the specific embodiments disclosed herein, but only in accordance with the appended claims, when read in light of the foregoing description.

What we claim is:

1. A method of removing insoluble impurities from water-based liquids comprising adding between 0.2 and 2.0 parts per million of a protein colloid of animal origin and between 2 and 200 parts per million solid particulate filter aid to a water-based liquid whose pH is controlled below the isoelectric point of the protein colloid, and subjecting the liquid containing the additives to filter aid filtration.

2. A method as defined in claim 1 wherein the protein colloid is added as a coating on said filter aid.

3. A method as defined in claim 1 wherein the protein colloid and filter aid are added as a physical mixture to said liquid.

4. A method as defined in claim 1 wherein the filter aid is selected from the group consisting of diatomaceous silica, perlite, and mixtures thereof.

5. A method as defined in claim 1 wherein the protein colloid is gelatin.

6. A method as defined in claim 1 wherein the protein colloid is animal glue.

7. A method as defined in claim 1 wherein the protein colloid has a gel strength between about 60–300 gram Bloom.

(References on following page)

References Cited

UNITED STATES PATENTS

| | | | |
|---|---|---|---|
| 706,075 | 8/1902 | Lubberger | 210—54X |
| 2,036,258 | 4/1936 | Cummins | 210—36 |
| 2,106,318 | 1/1938 | Elliott et al. | 210—506X |
| 3,147,218 | 9/1964 | Booth et al. | 210—54 |
| 3,165,465 | 1/1965 | Ray et al. | 210—54X |
| 3,235,490 | 2/1966 | Goren | 210—54X |
| 3,252,898 | 5/1966 | Davis | 210—75X |
| 3,335,869 | 8/1967 | Hedges | 210—500 |
| 3,338,828 | 8/1967 | Clark | 210—54X |
| 3,352,424 | 11/1967 | Guebert et al. | 210—36X |
| 3,227,650 | 1/1966 | Bell | 210—53 |
| 3,235,492 | 2/1966 | Andersen et al. | 210—36X |
| 3,242,073 | 3/1966 | Guebert et al. | 210—75X |

SAMIH N. ZAHARNA, Primary Examiner

U.S. Cl. X.R.

210—54, 75